May 6, 1924.

W. S. ALLEN

AUTOMOBILE HEADLIGHT

Filed Jan. 16, 1922

1,492,619

Inventor
William S. Allen

By [signature]
Attorney

Patented May 6, 1924.

1,492,619

UNITED STATES PATENT OFFICE.

WILLIAM SAYRE ALLEN, OF BIRMINGHAM, ALABAMA.

AUTOMOBILE HEADLIGHT.

Application filed January 16, 1922. Serial No. 529,373.

*To all whom it may concern:*

Be it known that I, WILLIAM SAYRE ALLEN, a citizen of the United States, residing at Birmingham, in the county of Jefferson and State of Alabama, have invented a new and useful Automobile Headlight, of which the following is a specification.

My said invention relates to automobile headlights and it is an object thereof to provide a headlight which shall be arranged also to throw light on the body of the machine. The main purpose of this is believed to be obvious as it is a matter of common knowledge that it is very difficult for an automobile driver to see a car moving at right angles to his at night and this results in many accidents. By lighting up the sides of the car danger of collision from this cause will be avoided.

Figure 1:
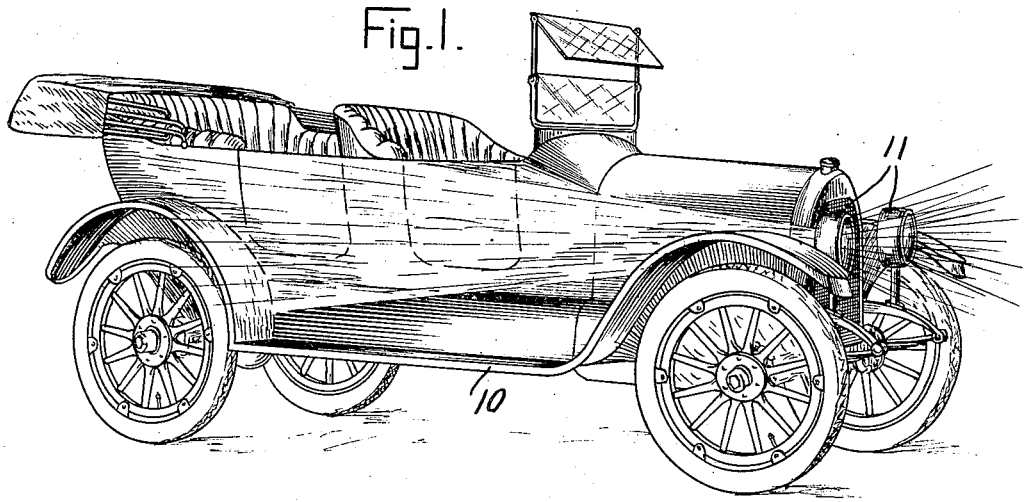
Figure 2:
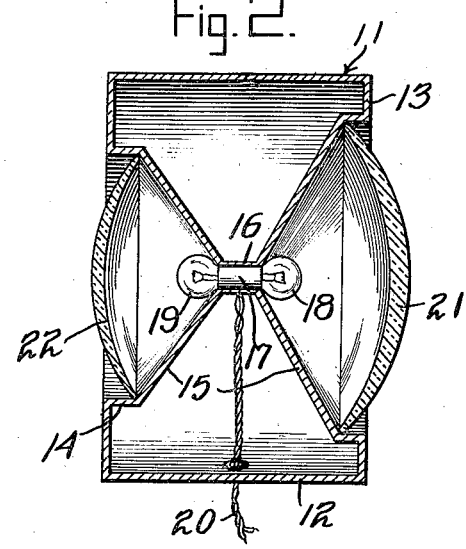

Referring to the accompanying drawings which are made a part hereof and on which similar reference characters indicate similar parts, Figure 1 is a perspective view of an automobile with my improved headlights attached thereto, and Figure 2 a central section of such a headlight.

In the drawings reference character 10 indicates an automobile having at the forward end a pair of headlights 11. Each of these headlights is made up of a cylindrical casing 12 having closed ends 13 with central recesses therein provided with an inwardly extending wall 14 and a conical wall 15 extending therefrom and polished or otherwise treated to form a reflector. The apexes of the conical reflectors are adapted to support a plug 17 supporting a pair of lamps 18 and 19. A conductor 20 for electricity, extending through the cylindrical casing to the plug 17, is shown in Figure 2.

At the front of the lamp 18 is a lens 21 providing with the lamp and the adjacent reflecting surface of the cone 15, a forwardly directed headlight having the usual functions. The lamp 19 is also surrounded by a reflecting surface on the other cone 15 and has spaced therefrom a lens 22, the whole providing a means for throwing a light along one side of the automobile of sufficient intensity to warn anyone approaching from the side of the machine. A similar structure is found at the opposite side of the machine.

It is within the purview of my invention to provide the rearwardly directed headlight with a lens of colored or parti-colored glass adapted to render the side of the car more conspicuous and various other changes may be made therein as, for example, to prevent annoyance to persons in following cars or in the same car, without departing from the spirit of my invention, the true scope of which is indicated in the appended claims.

Having thus fully described my said invention, what I claim as new and desire to secure by Letters Patent, is:

1. In an automobile headlight, a cylindrical casing having inwardly directed annular flanges at opposite ends and opposed conical portions rigid therewith forming reflectors, and means for supporting a lamp adjacent each reflector, substantially as set forth.

2. In an automobile headlight, a cylindrical casing having inwardly directed annular flanges at opposite ends and opposed conical portions rigid therewith forming reflectors, and means for supporting a lamp adjacent each reflector, substantially as set forth.

In testimony that I claim the foregoing, I have hereunto set my hand and seal this the 13th day of January, nineteen hundred and twenty two.

WILLIAM SAYRE ALLEN. [L. S.]

Witnesses:
 H. D. BREEDING,
 E. G. RUTHERFORD.